United States Patent [19]
Cullen et al.

[11] Patent Number: 5,732,230
[45] Date of Patent: Mar. 24, 1998

[54] COMPUTER USER INTERFACE FOR MANIPULATING IMAGE FRAGMENTS USING DRAG, DROP AND MERGE OPERATIONS

[75] Inventors: John F. Cullen, Redwood City; Mark Peairs; Peter E. Hart, both of Menlo Park, all of Calif.

[73] Assignees: Richo Company Ltd., Tokyo, Japan; Richo Corporation, Menlo Park, Calif.

[21] Appl. No.: 446,196

[22] Filed: May 19, 1995

[51] Int. Cl.$^6$ ..................................................... G06F 3/00
[52] U.S. Cl. ........................... 395/339; 395/135; 358/450
[58] Field of Search ...................... 395/155, 157, 395/159, 161, 135, 339, 133, 138; 358/450

[56] References Cited

U.S. PATENT DOCUMENTS

| | | |
|---|---|---|
| 5,022,085 | 6/1991 | Cok ............................................. 382/1 |
| 5,140,647 | 8/1992 | Ise et al. ..................................... 382/41 |
| 5,185,808 | 2/1993 | Cok ............................................. 382/1 |
| 5,473,737 | 12/1995 | Harper ....................................... 395/131 |
| 5,611,033 | 3/1997 | Pilleloud et al. ........................... 395/135 |

FOREIGN PATENT DOCUMENTS

| | | |
|---|---|---|
| 0235902 | 1/1987 | European Pat. Off. |
| 4-235464 | 8/1992 | Japan. |
| WO 93/12501 | 6/1993 | WIPO. |

Primary Examiner—Raymond J. Bayerl
Assistant Examiner—A. Katbab
Attorney, Agent, or Firm—Charles J. Kulas; Philip H. Albert; Townsend and Townsend and Crew LLP

[57] ABSTRACT

A system for manipulating image fragments so that image processing devices such as copiers, fax machines and scanners may efficiently process oversize images. The system provides a user interface so that when an oversize image is scanned in multiple parts to produce multiple image fragments the user can manipulate the image fragments by performing drag, drop and merge operations on the image fragments. Embodiments of the invention include the use of a touch screen or mouse to allow the user to perform the operations. Other operations are selectable such as rotating an image fragment, zooming in or out on portions of the displayed fragments, merging the fragments into an integrated image and storing or printing the image fragments.

17 Claims, 10 Drawing Sheets

COMPUTER USER INTERFACE FOR MANIPULATING IMAGE FRAGMENTS USING DRAG, DROP AND MERGE OPERATIONS

Notice Regarding Copyrighted Material

A portion of the disclosure of this patent document contains material which is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

This invention relates generally to a user interface for manipulating images and specifically to a computer user interface for combining image fragments.

Today, image processing devices allow images to be "captured" by computer systems by, e.g., scanning a printed version of an image to obtain a digital representation of the image. Also, digital representations of images can be printed to generate a hard copy of the image. Examples of image processing devices are copiers, fax machines and scanners. These systems now use advanced technology to allow a human operator to manipulate the captured image by reducing, enlarging, adjusting the contrast, resolution or color of images, etc. While today's basic image processing devices are well-suited to handling standard size images, such as an image on an 8.5"×11" sheet of paper, problems arise in these devices where an oversize image needs to be broken into image fragments in order to capture the image into a device. Problems also arise where image fragments need to be re-assembled for printing as a single integrated image on one or more sheets of paper.

For example, a problem with copy machines arises when it is desired to copy an oversize image, such as a map or poster. This is because the configuration of the copy machine will usually allow only portions, or fragments, of the oversize image to be scanned in each pass of the copier's scanning mechanism. This means that the human user of the copier needs to manually position the oversize image and make multiple scans of portions of the map or poster. Because the user must visually align the oversize image on the copier's platen, often without the aid of any registration marks, the user ends up with a hodgepodge collection of non-uniform fragments of the oversize image spread out over the papers. In the worst case, the user must then manually assemble the image fragments by cropping and taping together the pages.

Similarly, fax machines are limited to accepting paper of fixed and relatively small dimensions. If an oversize document is wider than that allowable by the fax machine the document must be broken up into smaller images on smaller sheets of paper. The oversize image is then transmitted as several pieces to a receiving fax machine. A user at the receiving fax machine then goes through a similar process to piece together the oversize document's image from the multiple fragments of the document.

Another instance of the shortcomings of today's imaging devices to handle oversize documents can be seen in a hand-held scanning device. With the hand-held scanner the image must be scanned multiple times by having the user "swipe" the hand-held scanner over the image. Where a document is large, the hand-held scanning operation results in many image fragments that need to be pieced together.

Approaches to deal with this problem include the matching together of 2 images captured sequentially by the hand scanner. However, an approach such as this, described in European patent application IPN WO 93/12501, fails to provide an adequate way for a user to work with large images that have been fragmented into several pieces by the scanning process.

Other approaches for combining images in today's image processing devices include, U.S. Pat. No. 5,022,085 to David R. Cok. This patent discloses an imaging data mechanism for merging, or compositing, a first image onto a second image. Once composited, the Cok invention uses special techniques for reducing boundary artifacts caused when a first image edge lies on top of a second image.

Another system disclosed in European patent application number 87300562.3 shows compositing a first image onto a second image. The invention discloses techniques for detecting the first image's edges so that the compositing operation can be made more automatic. Japanese patent JP 4235464 discloses a system for merging two different images input from main and sub-image sensor units. U.S. Pat. No. 5,140,647 discloses applying markers to document images and then using the markers to register the images.

The above references do not solve the problems of the prior art in handling oversize images efficiently in image processing devices such as copiers, fax machines and scanners. Some of the references are related to compositing operations where a first image is laid on top of a second unrelated image and an attempt is made to make the images look as though they are one image by removing border artifacts. This differs from the situation where image fragments need to be aligned adjacent to one another so that, for example, an image detail such an object or letter that is broken up over two image fragments is made to appear whole again. All of the references fail to disclose a system for efficiently manipulating large numbers of image fragments to create a large composited image.

Accordingly, it is desirable to provide an image processing device that allows efficient manipulation of image fragments so that oversize images can be handled with greater ease and accuracy.

SUMMARY OF THE INVENTION

The present invention provides a graphical user interface (GUI) to image processing devices. The GUI allows a user to perform operations such as selecting, dragging and dropping displayed representations of the image fragments to indicate a user preferred alignment for the fragments. The use of such an approach greatly simplifies the user's task in handling oversize documents with standard image processing devices such as copiers, fax machines and scanners.

One embodiment of the invention includes a method for registering image fragments in a computer system. The computer system includes a processor coupled to a user input device, scanning device and display screen. The method comprises the steps of using the scanning device to input two or more image fragments of an original image; using the processor to display at least a portion of the first image fragment and at least a portion of the second image fragment simultaneously on the display screen; accepting signals from the user input device to select the first image fragment displayed on the display screen; moving the first image fragment on the display screen so that a portion of the first image fragment is adjacent to and aligned with the portion of the second image fragment; and registering, by using the processor, the first and second image fragments into a combined image that closely approximates at least a portion of the original image, wherein the registering step uses the adjacency and alignment from the previous step.

An apparatus for registering image fragments in a computer system is also disclosed. The apparatus comprises a processor; a memory coupled to the processor; a user input device coupled to the processor; a display screen coupled to the processor; a data input device restoring representations of two or more image fragments of an original image into the memory; display means for displaying at least a portion of the first image fragment and at least a portion of the second image fragment simultaneously on the display screen; selection means for accepting signals from the user input device to select the first image fragment displayed on the display screen; redisplay means for moving the first image fragment on the display screen in response to signals from the user input device; position determining means generating one or more parameters describing the locations of the moved first image fragment relative to the second image fragment when the moved first image fragment is adjacent to, and aligned with, a portion of the second image fragment; and registration means coupled to the display means for receiving the parameters and for registering the first and second image fragments into a combined image based on the parameters.

DESCRIPTION OF THE PREFERRED EMBODIMENT

Figure 1:
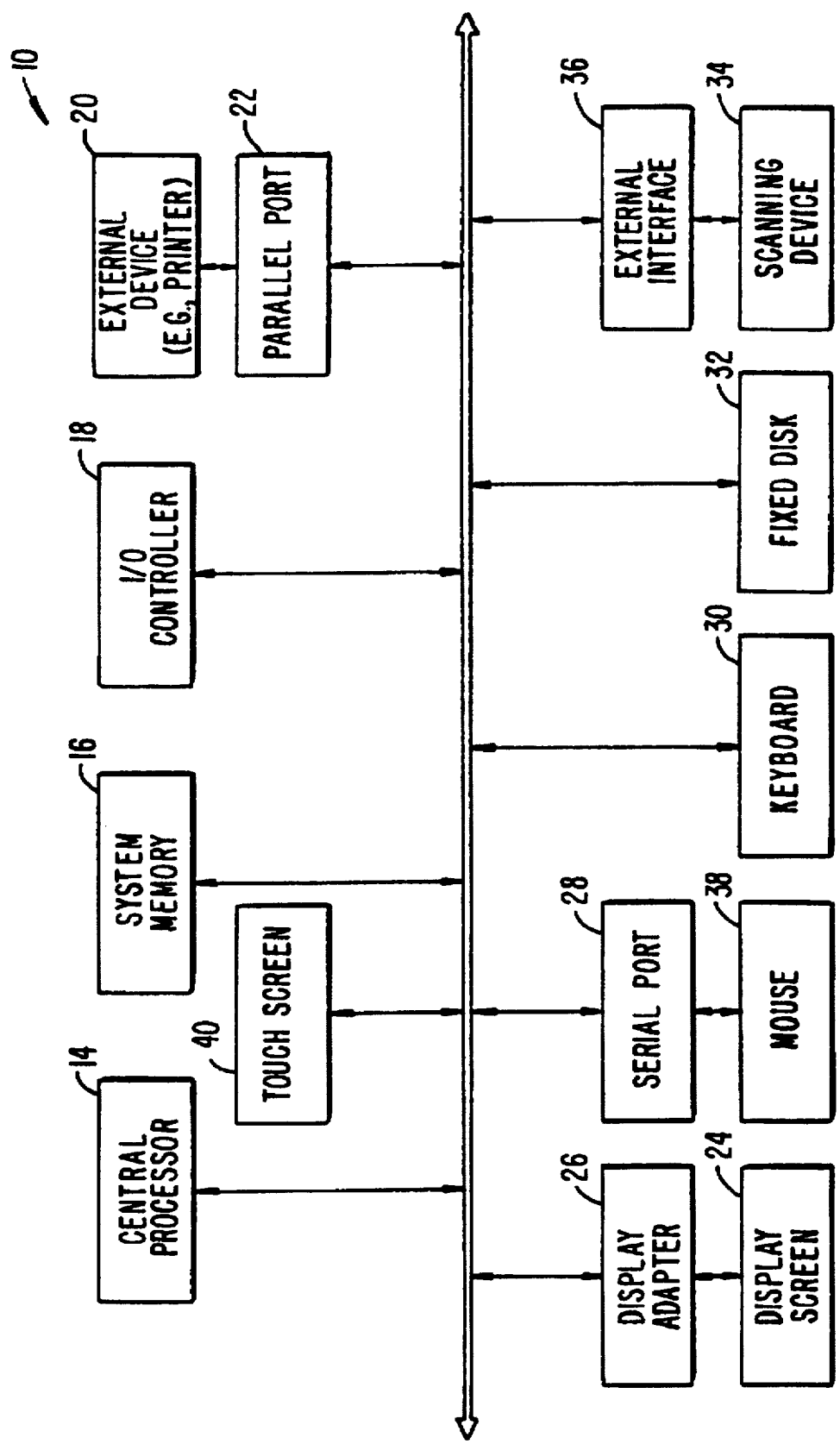
FIG. 1 shows basic subsystems of a computer system suitable for use with the present invention.

FIG. 1 shows basic subsystems of a computer system suitable for use with the present invention. In FIG. 1, computer system 10 includes bus 12 which interconnects major subsystems such as central processor 14, system memory 16, input/output (I/O) controller 18, an external device such as a printer 20, parallel port 22, display screen 24 via display adapter 26, serial port 28, keyboard 30 and fixed disk 32. Many other devices can be connected such as scanning device 34 connected via external interface 36, mouse 38 connected via serial port 28 and touch screen 40 connected directly. Many other devices or subsystems (not shown) may be connected in a similar manner. Also, it is not necessary for all of the devices shown in FIG. 1 to be present to practice the present invention, as discussed below. The devices and subsystems may be interconnected in different ways from that shown in FIG. 1. The operation of a computer system such as that shown in FIG. 1 is readily known in the art and is not discussed in detail in this application.

Figure 2:
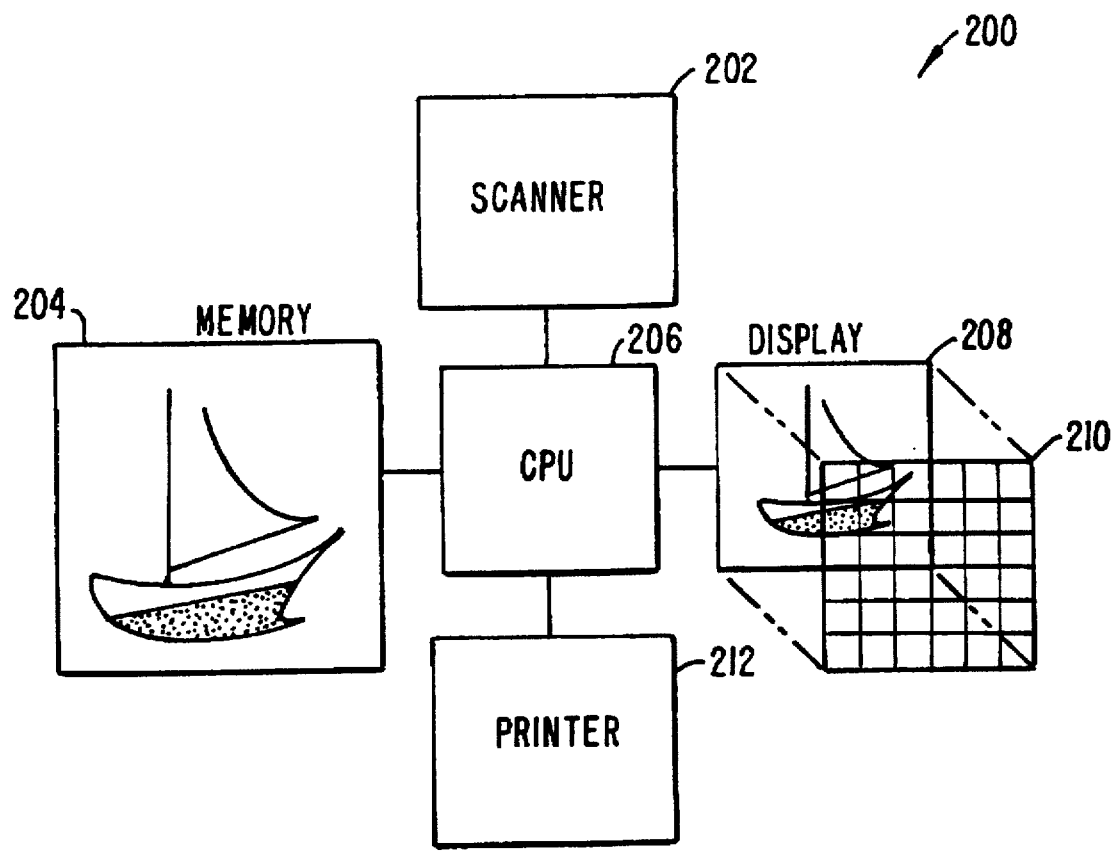
FIG. 2 shows a configuration of subsystems for a preferred embodiment.

FIG. 2 shows configuration 200 for a preferred embodiment including scanner 202, memory 204, CPU 206, display 208, touch screen 210 and printer 212. Configuration 200 could implement, for example, a copier machine. Configuration 200 could also be a portion of hardware in a fax machine or scanner. The present invention is adaptable for use in any system where an oversize image must be scanned piecemeal so that fragments of the oversize image are input into the system.

Display 208 can be a liquid crystal display (LCD) screen or a cathode ray tube (CRT) screen or other type of display screen or panel. The display screen is similar to that in use on standard computers such as personal computers or workstations employing a CRT screen or monitor. Various forms of user input devices may be used with the present invention. For example, even though a touch screen is shown in FIG. 2, a mouse input device that allows a user to move a pointer displayed on the display screen in accordance with user hand movements is a standard user input device. A mouse usually includes one or more buttons on its surface so that the user may point to an object on the screen by moving the mouse and may select the object, or otherwise activate the object, by depressing one or more buttons on the mouse. The touch screen allows a user to point to objects on the screen to select an object and to move the selected object by pointing to a second position on the screen. As discussed below, various buttons and controls may be displayed on the screen for activation by using the mouse or touch screen.

Figure 3:
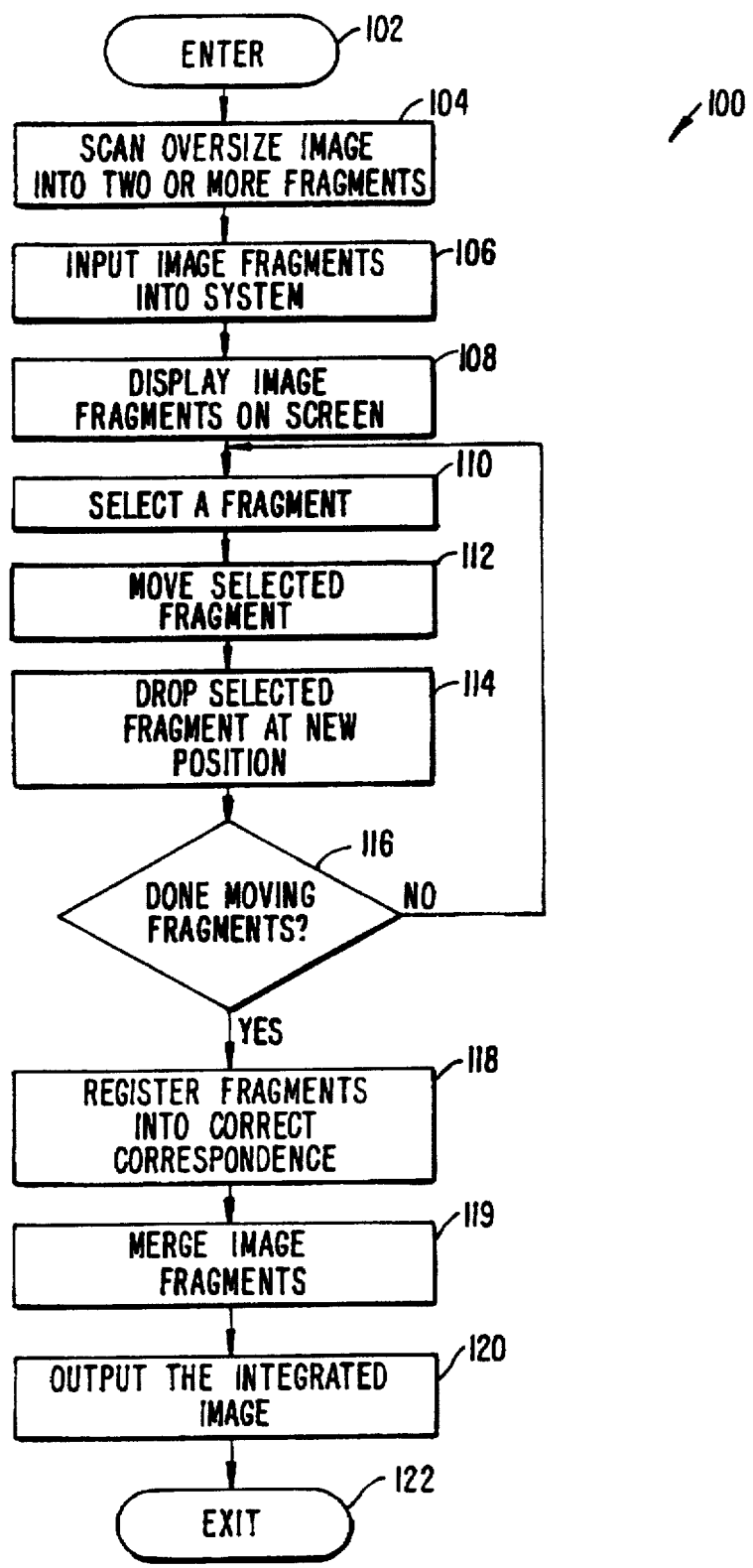
FIG. 3 shows flowchart 100 illustrating a method of the present invention.

FIG. 3 shows flowchart 100 illustrating a method of the present invention.

The flowchart is illustrative of merely the broad logical flow of steps to achieve a method of the present invention and that steps may be added to, or taken away from, the flowchart without departing from the scope of the invention. Further, the order of execution of steps in the flowchart may be changed without departing from the scope of the invention. Additional considerations in implementing the method described by the flowchart may dictate changes in the selection and order of steps.

In general, the flowcharts in this specification include one or more steps performed by software routines executing in a computer system such as computer system 1 of FIG. 1. The routines may be implemented by any means as is known in the art. For example, any number of computer programming languages, such as "C", Pascal, FORTRAN, assembly language, etc., may be used. Further, various programming approaches such as procedural, object oriented or artificial intelligence techniques may be employed.

The steps of the flowcharts may be implemented by one or more software routines, processes, subroutines, modules, etc. Some considerations such as interrupt driven, polled, or other implementation schemes may affect the order of steps performed by software. A multiprocessing or multitasking environment could allow steps to be executed "concurrently."

Flowchart 100 is entered at step 102. At step 104, the original oversize image is scanned into two or more image fragments. An example of an oversize image is a map. Typically, a map is much larger than the 8.5"×11" paper size that most copiers, fax machines and scanners accept. While some copiers do allow for larger image sizes, copiers that accept images much larger than 11"×17" are more expensive and often require specially trained operators. Note that the oversize image may be spread across two or more separate pieces of paper. The image fragments may be obtained by loading electronic representations of the image fragments directly into the system of the present invention. In this case, the scanning step 104 is bypassed. Other ways to obtain multiple image fragments from an original oversize image are possible.

At step 106 the obtained image fragment data is input into the system of the present invention. Usually this step results in the image fragment data being stored in the memory or other storage medium of the system. In the case where the original oversize image is scanned the image fragment data is obtained from the scanner and is transferred into the memory of the computer system which performs the steps described below.

After step 106 is executed step 108 is performed to display the image fragments on the display screen. Step 108 is performed by processor 14 which controls the selection and display of image fragments stored in memory 16 onto display screen 24.

In a preferred embodiment, all of the image fragments are displayed on the display screen at one time. In order to display all of the multiple image fragments on the display screen at the same time, the image fragments are reduced. For example, an 8.5"×11" format page might be shown as a rectangle with the same aspect ratio with a size on the order of 1" to 2" on a side. The need for reducing an image on the display is necessary when the screen resolution is not fine enough to show all of the fragments at a nominal level of detail. In a preferred embodiment, when a page is reduced a reduced image of the information printed on each page is also displayed on the reduced page so that each page appears on the screen with a suggestion of its image. This allows the pages to be distinguished easily on the screen.

Note that the shape of each fragment on the screen approximates the shape obtained from the scan or other source of image fragments. That is, where the original oversize image has been scanned in rectangular regions the image fragments are shown on the display as rectangular areas having the same relative dimensions as the scanned region. For a copy machine, this will typically be an 8.5"× 11" or 11"×7" page that is shown as an accordingly reduced rectangle on the display screen. However, where the scanner is a hand-held scanner, the scan "footprint" may vary so that the image fragment is a long, narrow band or other irregular shape. Regardless of the shape of the scan footprint the present invention maintains an approximation to the footprint in the display of the image fragment on the screen.

The display screen should have sufficiently high resolution to allow the user to identify image fragments by larger, gross aspects of the portion of the image on the image fragment. It is especially desirable for text to be readable, where such text is relatively small in the original oversize image. As discussed below, the invention provides for "zooming" in on an image fragment to view more of the detail of the image portion contained in the fragment.

Steps 110–116 form a loop that describes the steps a user performs to manipulate image fragments to create an integrated image. At step 110, the user selects an image fragment on the display screen. Where the user input device is a mouse, the user may perform step 110 by moving a pointer on the display screen over an image to be selected. The user moves the pointer by manipulating a mouse as is known in the art. Once the pointer is over the desired image fragment, the user depresses a button on the mouse to select the image fragment. Many other forms of user input may be used to perform step 110 and other steps such as 112 and 114. For example, a trackball, so-called "point pad," dataglove, digitizing tablet, etc., may be employed. A preferred embodiment uses a touch screen so that the user may point to or touch areas of the display screen directly with their fingers or some other object such as a stylus. The use of the touch screen eliminates the need for a flat surface to operate the mouse so that the system of the present invention may be made more compact.

Next, step 112 is performed so that the user can move the selected fragment to a new position on the display screen. Where a touch screen is used, the user may point to a new position for the fragment or may "drag" the fragment about the screen by pointing while moving the position of the finger on the screen. Where a mouse is the user input device, the user may perform step 112 by using the mouse to move the pointer on the screen so that the selected fragment is dragged along with the pointer. When the user has moved the selected fragment to a desired position, the user executes step 114 so that the selected fragment is released or "dropped" to assume its new position on the display screen.

Step 116 indicates that steps 110–114 may be performed repeatedly, as needed, so that the user may arrange image fragments freely on the screen. The purpose of the fragment manipulation is to allow the user to easily put the image fragments together on the screen and build the original oversize image out of the image fragments. It is not necessary for all of the image fragments to be displayed on the display screen at one time, although this is preferable to aid in the image fragment manipulation. Image fragments may be overlaid onto other image fragments or positioned so that the edges of different image fragments are adjacent.

Image fragments can also be transparent. This allows a user to view image fragments underlying other image fragments. It also allows the user interface to generate a uniform background where fluctuations in the scanning of the image fragment produce an undesirable varying background. An undesirable varying background occurs, for example, where engineering schematics, blueprints or drawings originally have a uniform background but whose scanned fragments have varying backgrounds because of the different levels of gray detection due to the imprecise auto gain control in digital scanners. By making the background (varying levels of gray) transparent while retaining the foreground information containing the lines, symbols, text, etc., the user interface of the present invention can generate a uniform background that provides the user with more discernible and pleasing images.

Once the user is done manipulating image fragments, the loop of steps 110–116 is exited and step 118 is performed. Step 118 registers the image fragments into an integrated image, according to the current orientation of the image fragments on the display screen. In a preferred embodiment, step 118 is invoked by user selection. The user is able to select registration of the image fragments in the current orientation of fragments on the display screen by activating a predetermined user interface control, for example, by activating a "button" on the screen. The activation of the control to register the image fragments causes the processor to execute instructions to calculate relative positions for each image fragment. Another control is provided by to allow the user to "merge" the image fragments into a single integrated image made up of multiple image fragments. The merge operation uses the relative positions calculated by the register operation to achieve the integrated image. Thus, in a preferred embodiment the dual steps of registering and merging are required. However, for ease of discussion "registering" is generally regarded as including the merging operation in this specification.

A simple way to achieve registration is to use the coordinates of each image fragment in their relative positions on the display screen. That is, there is no further automated registration of the image fragments beyond the user's own positioning. In most cases, this may be sufficient, since, as discussed below, the user is provided with various tools to aid in accurate alignment, positioning and merging of the image fragments to produce an integrated image.

Where automated registration is desired, the present invention allows for, e.g., computerized registration, where the processor makes decisions based on a predetermined algorithm as to how to align shapes, objects, etc., from one edge of an image fragment to an adjacent edge of another image fragment. The shapes, objects, etc., are discrete pictures broken up across two or more image fragments. For example where a line segment extends from the first image fragment to a second image fragment and the user has placed an edge of the first image fragment cutting through the line segments adjacent to an edge of the second image fragment that also cuts through the second image fragment's portion of the line segment, the processor could execute instructions to ensure that the image fragments are "fine tuned" so that the split ends of the line segment abut as precisely as possible. Other forms of automated registration are possible by using special "fiducial," or registration marks, on each image fragment and aligning the image fragments by ensuring that the fiducials exactly overlie each other. Extrapolation of image data to extend features beyond current image fragments, or interpolation to derive image data between two fragments, could also be employed. Also, "smoothing" or other forms of image enhancement could be used to improve the integrated image after merging. For example, image smoothing or averaging would be useful at the joining point of two image fragments where there is not an exact match and a noticeable edge, or artifacting, occurs.

Next, after the image fragments have been registered, step 119 is performed to merge the image fragments into an integrated image. In a preferred embodiment, the step of merging the image fragments creates a single digital file containing the information in each of the image fragments included in the registered image. The file may reside in memory or in persistent storage, such as on a magnetic disk. The file can be of various formats. For example, the file can be a simple bitmap representation of the registered image. Another possibility is for the file to contain the image fragments as discrete objects along with information about the alignment of each image fragment in the registered image. Other file formats are possible.

The integrated, or merged, image is output at step 120. An example of outputting the integrated image could be printing the integrated image in reduced form on a standard sheet of paper, printing the integrated image to full scale on a large sheet of paper, electronically transferring the integrated image to another device, storing the integrated image, etc. After outputting the integrated image, the method described by flowchart 100 in FIG. 2 is exited at step 122.

Note that the steps of flowchart 100 may be selectively repeated, for example, to add more image fragments to an existing integrated image. An additional image fragment can be selected at step 110 after a first integrated image has been created as described above. The additional image fragment is then moved, dropped, registered and merged, as desired, to add the additional image fragment to the existing integrated image.

In a fax machine application, the invention is particularly useful at either the receiving or sending fax machines to allow a human user to drag, drop and merge, or otherwise manipulate, image fragments from multiple sheets of paper. For example, at the sending fax machine multiple sheets of paper, each containing an image fragment of an original image, can be scanned by the fax machine. Prior to sending the image fragments to the receiving fax machine, the image fragments can be processed as described above in flowchart 100 to obtain an integrated image. The image fragments can then be transmitted along with coordinate information for allowing a processor in the receiving fax machine to automatically reproduce the original image.

The reproduced image can be displayed on a display screen for further manipulation by a human operator at the receiving fax machine. For example, the operator at the receiving fax machine may desire to reduce the received image to fit on a single sheet of paper before printing. Or the receiving operator may wish to re-align the received image over multiple sheets of paper before printing. By allowing the receiving operator to access the electronic version of the original image as an integrated image, the operator is given greater flexibility over the receipt of the image. Likewise, the sending operator may decide, for example, to reduce the integrated image before sending.

Figure 4:
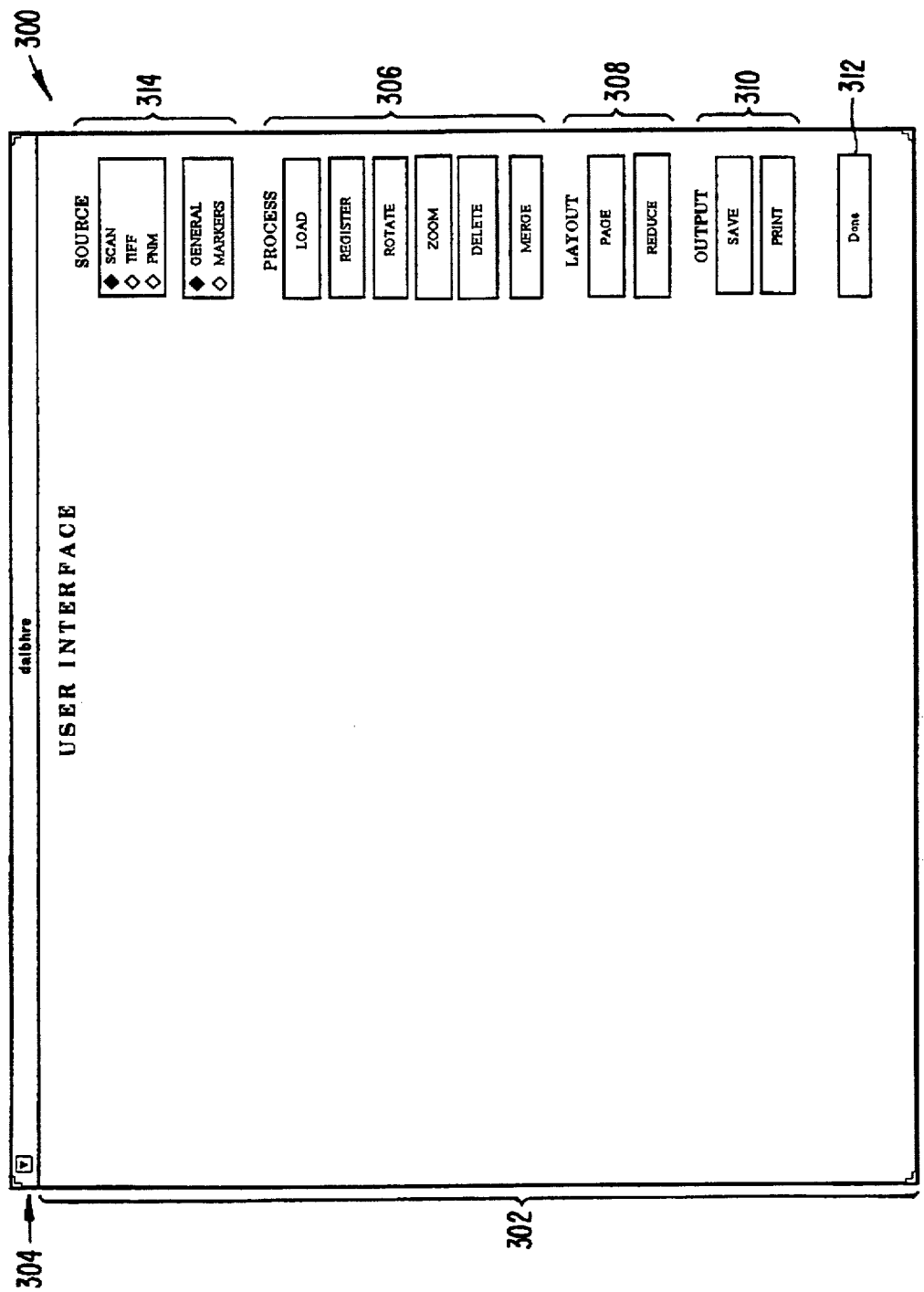
FIG. 4 shows a first screen display of the user interface of the present invention.

FIG. 4 shows a screen display of the user interface of the present invention. In FIG. 4, screen display 300 includes work area 302 that occupies essentially all of the screen except for title bar 304. Buttons, such as process buttons 306, layout buttons 308, output buttons 310 and DONE button 312 overlay work area 302 toward the right of the screen. Indicators 314 also occupy some space on top of work area 302.

Figure 5:
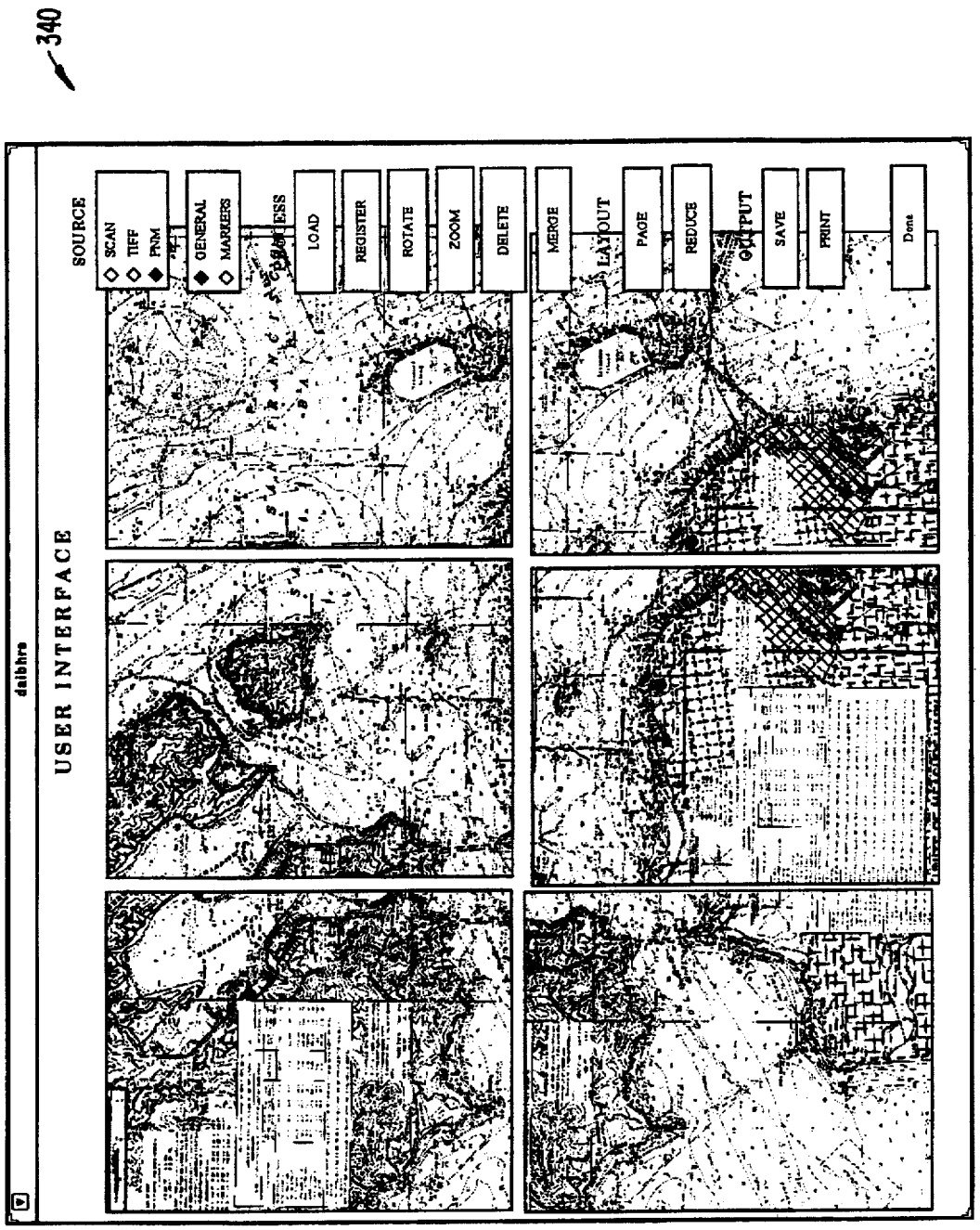
FIG. 5 shows a second screen display of the user interface of the present invention.

FIG. 5 shows screen display 340 after image fragments have been loaded into the system. That is, FIG. 5 shows screen display 340 as it would appear after steps 104–108 of flowchart 100 of FIG. 3 have been executed. In FIG. 5, six rectangular page fragments are arbitrarily arranged as two rows and three columns of pages. As can be seen in FIG. 5, the indicators and buttons overlay the pages displayed on the display screen.

Figure 6:
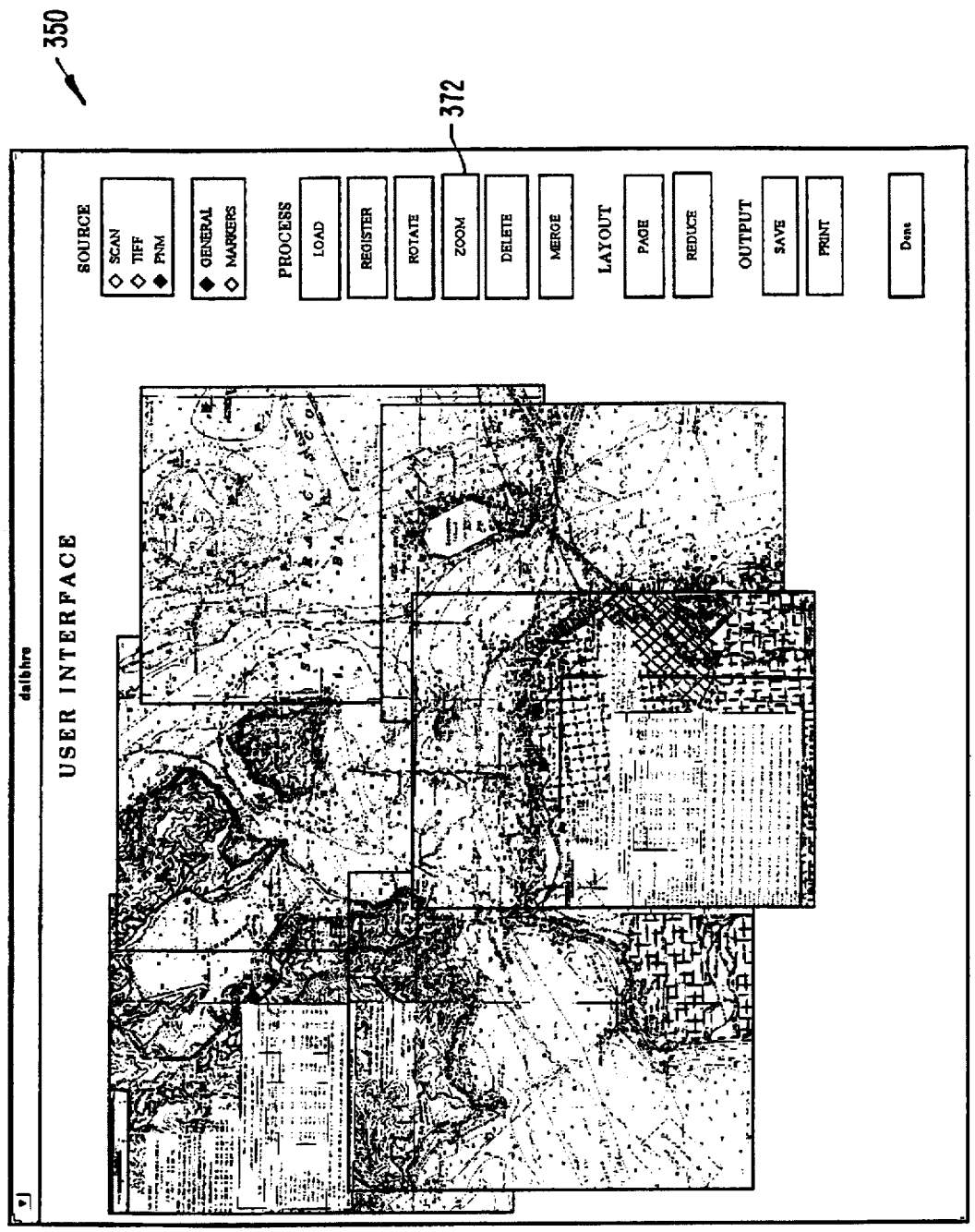
FIG. 6 shows a third screen display of the user interface of the present invention with 6 manipulated image fragments.

FIG. 6 shows screen display 350 after the image fragments shown in FIG. 5 have been brought into spatial correspondence with each other. Thus, FIG. 6 shows screen display 350 after steps 110–116 of the flowchart of FIG. 3 have been performed. In FIG. 6, the user has manipulated the page fragments so that the pages are aligned with each other to recreate the original oversize image. Note that, in FIG. 6, the pages are shown overlapping each other in order to obtain the integrated image. Other embodiments in the invention could allow for cropping the pages so that the page may be cut so that the edges can abut each other without overlapping.

An example of an application where pages would not overlap but would abut each other is where multiple different pages of a book are scanned and manipulated by the system. The user of the system could register and merge the multiple pages into a single composite document. When the page scanned is smaller than the a standard page handled by the scanner, as, for example, when a book page is smaller than the standard 8.5"×11" page scanned by a copy machine, a useful tool is a "box mask" that allows the user to define a box around the smaller scanned image in the user interface to crop unwanted edge areas around the desired image. Any cut-and-paste tools that are found in standard desktop publishing computer programs may be used with the GUI of the present invention to give a user more flexibility in manipulating image fragments.

Figure 7:
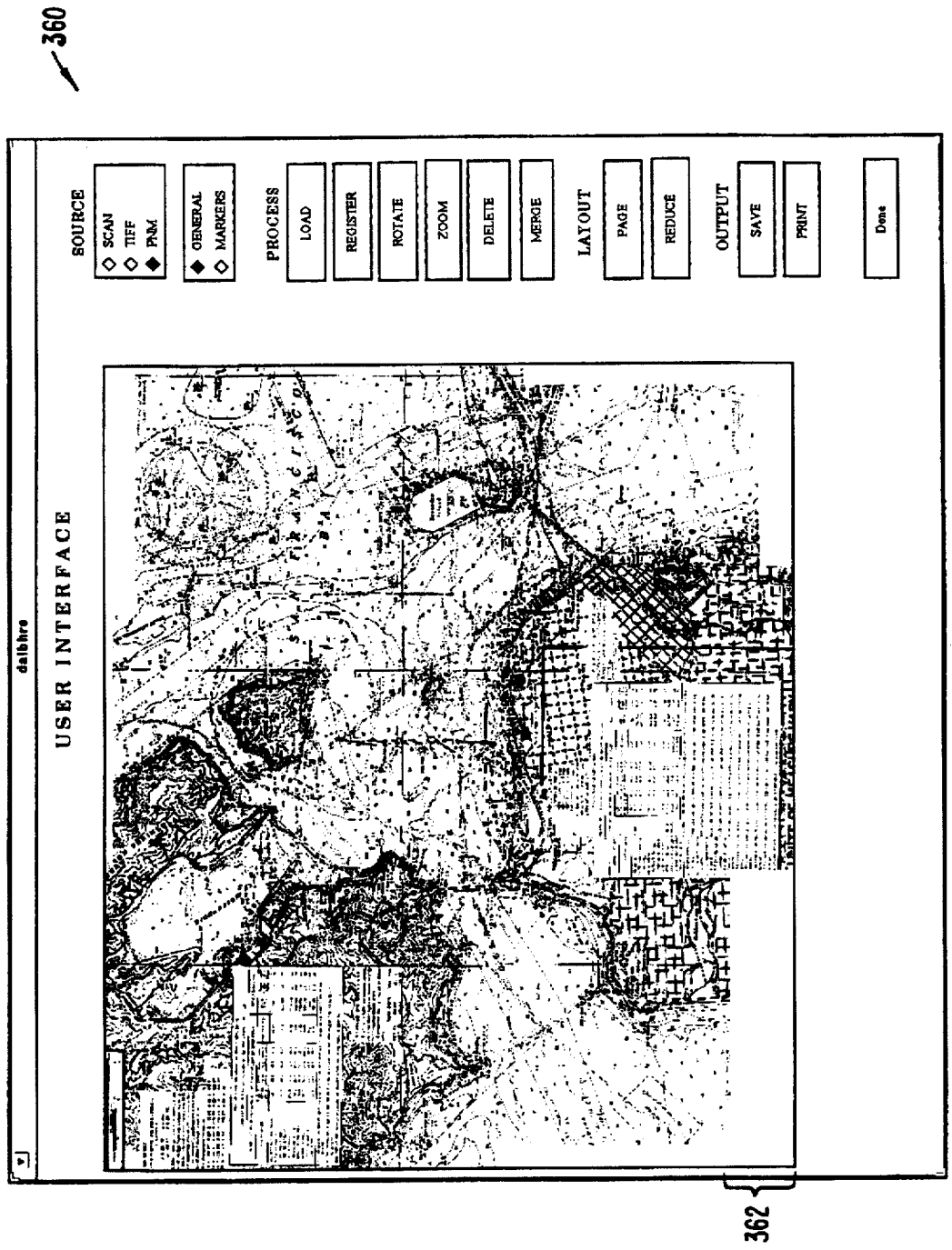
FIG. 7 shows a fourth screen display of the user interface of the present invention with merged fragments.

FIG. 7 shows screen display 360 after the manipulated pages of FIG. 6 have been "registered," or "merged," into a single integrated image. Note that the merge operation creates whitespace in order to fit the merged image into a rectangular area. An example of whitespace used to fill the rectangular area is whitespace at 362. Alternatively, a background color or pattern from one of the images can be used to fill in the spaces of the rectangular area.

Figure 8:
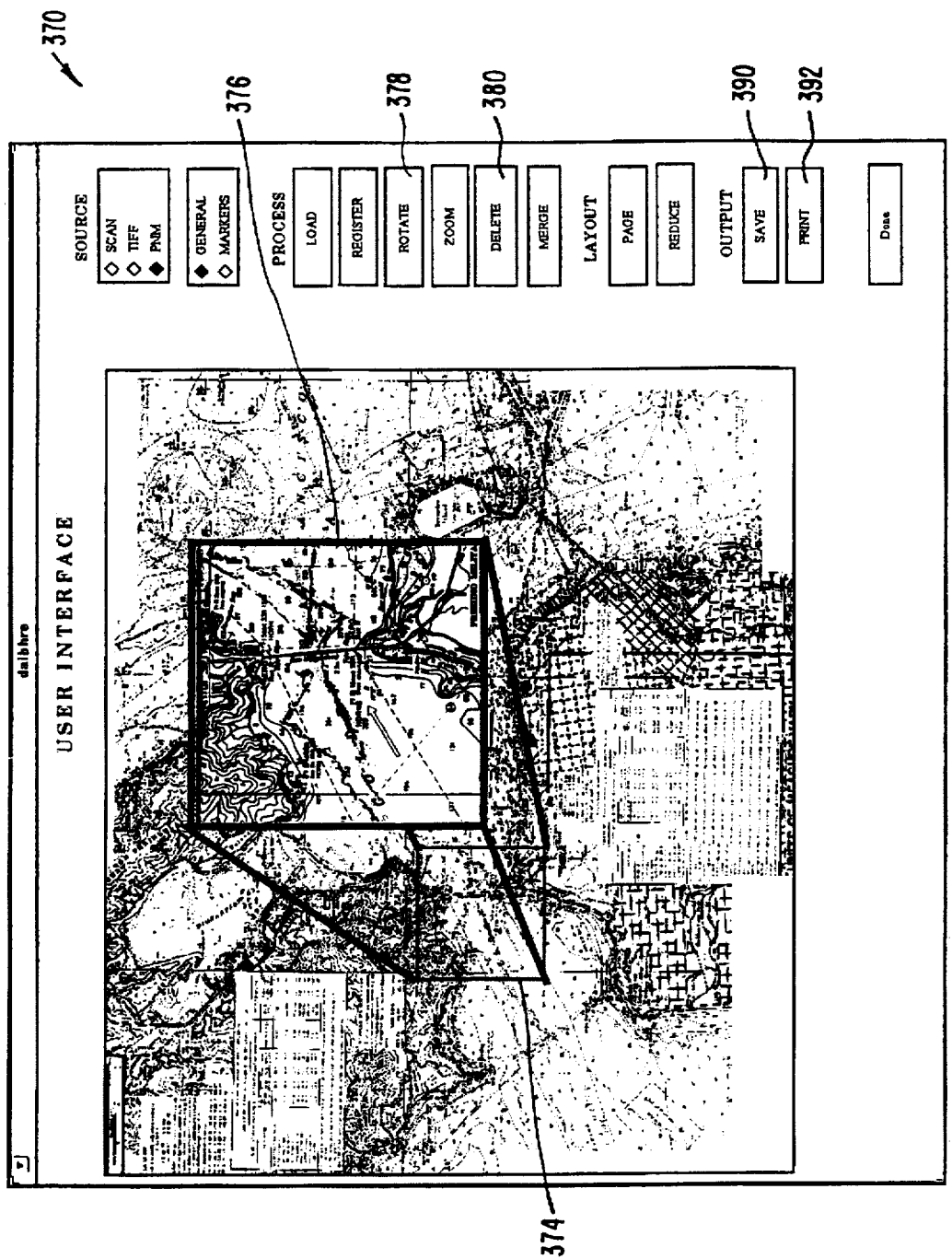
FIG. 8 shows a fifth screen display of the user interface of the present invention.

FIG. 8 shows screen display 370 and illustrates the zoom function of the present invention. The zoom function is used during the execution of steps 110–116 of flowchart 100 in FIG. 3 while the user is manipulating image fragments on the screen. Assuming the user is presented with the screen display 350 of FIG. 6, the user may delineate a region for zooming. One way to delineate such a region is by pointing to opposing corners of a rectangle with the pointing device (e.g., the touch screen or mouse). Next, the user selects the zoom function by activating zoom button 372 in FIG. 6.

After activation of the zoom function the user is presented with a display similar to screen display 370 of FIG. 8. In FIG. 8, the delineated portion of the image 374 has been enlarged so that more details of the delineated area are visible within zoom window 376. Other ways of implementing the zoom function are possible. For example, the zoom could fill the entire work area of the screen display. The delineated area may be other than a rectangle, etc. Other functions to aid the user in manipulating image fragments for merging are the ROTATE button 378 which allows rotation of image fragments on the screen and the REGISTER button. The REGISTER button brings image fragments into correct spatial correspondence. The rotate function may be implemented as a set of functions that sequentially decide the best alignment of the fragments or decide on a globally optimal simultaneous alignment of the image fragments. The image can be kept on the disk storage of the computer system or can be kept in the computer's memory. For large images it may be necessary to use virtual memory.

The DELETE button 380 removes image fragments from the screen. In a preferred embodiment, the topmost image fragment is removed. The topmost image is determined from a "priority queue" that keeps track of images in, for example, an order according to most recent use of an image. Alternatively, the fragment that is "on top" of all other fragments, as determined by the user's manipulations of fragments, can be the one deleted. The PAGE button performs an operation to achieve a "best fit" of the image to the size of paper available. If the REDUCE button is picked then the image is reduced to fit the page size available on the machine. The user may save the state of manipulation of the image fragments at any time by selecting the SAVE button 390 and may print the current orientation of image fragments as seen on the display by selecting PRINT button 392.

Figure 9:
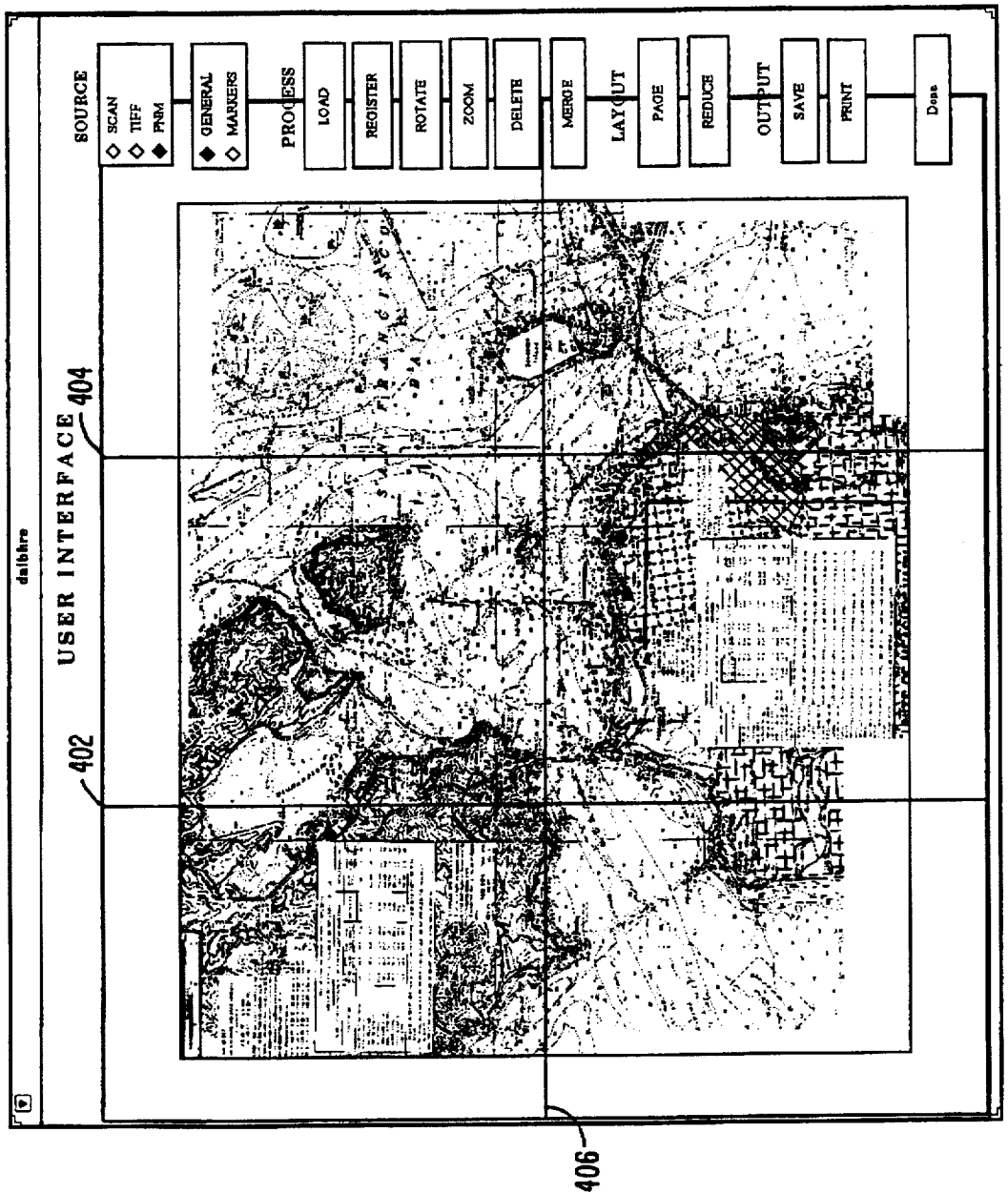
FIG. 9 shows a sixth screen display of the user interface of the present invention.

FIG. 9 shows an optimized page layout for the merged image. FIG. 9 is generated in response to the user selecting the PAGE button. By selecting PAGE the system of the present invention automatically determines an optimized page layout as shown by pagination markings such as horizontal pagination markings 402 and 404 and vertical pagination marking 406 in FIG. 9. The system strives to fit the integrated image onto as few pages of paper as possible by adjusting the number, position and orientation of the pages onto which the integrated image will be printed.

Figure 10:
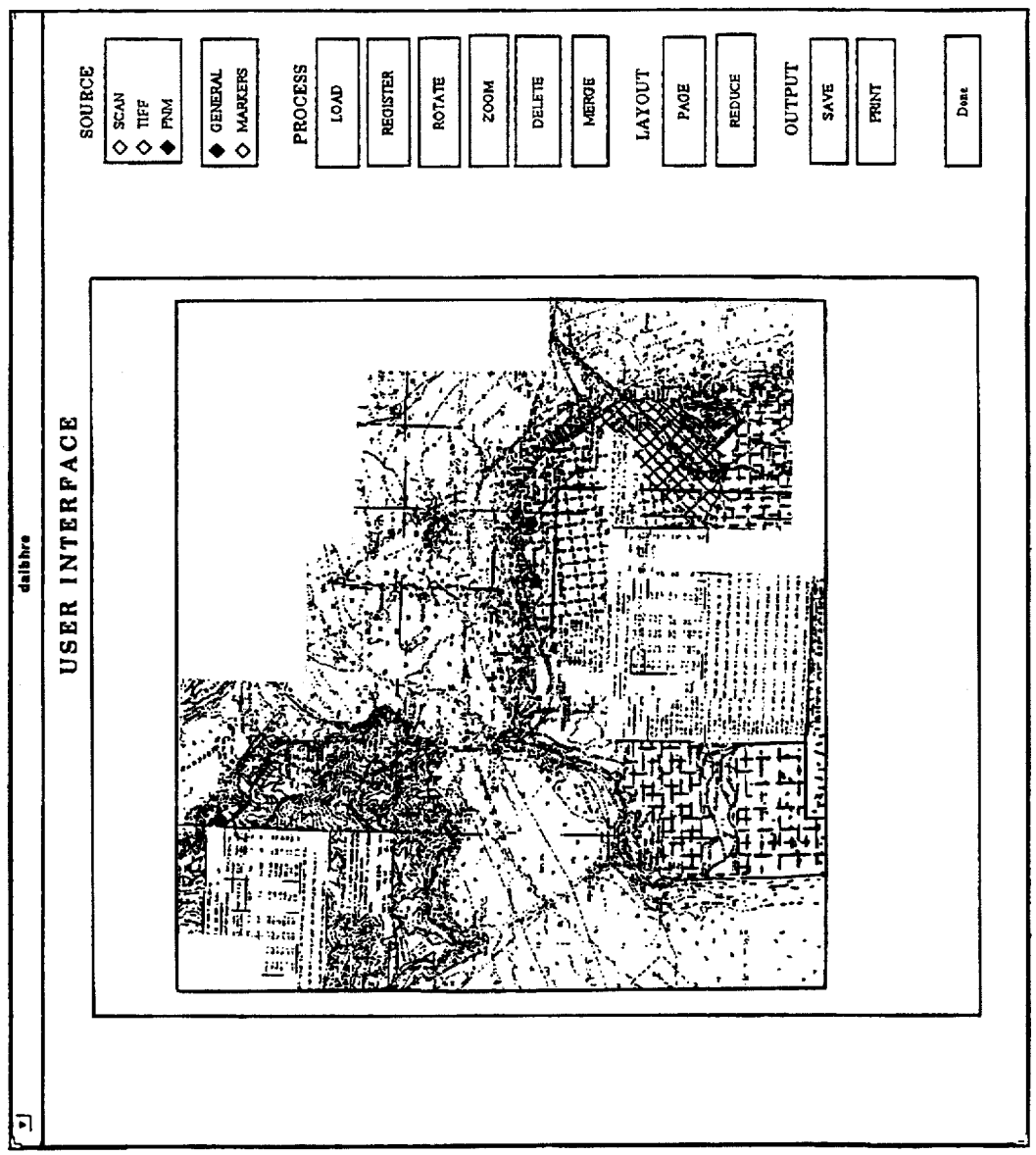
FIG. 10 shows a seventh screen display of the user interface of the present invention.

FIG. 10 shows the result of the reduce function where the user may activate the REDUCE button causing the system to shrink the merged image to fit on a single page of paper.

In the foregoing specification, the invention has been described with reference to a specific exemplary embodiment thereof. It will, however, be evident that various modifications and changes may be made thereunto without departing from the broader spirit and scope of the invention as set forth in the appended claims. For example, various programming languages and techniques can be used to implement the disclosed invention. Also, the specific logic presented to accomplish tasks within the present invention may be modified without departing from the scope of the invention. Many such changes or modifications will be readily apparent to one of ordinary skill in the art. The specification and drawings are, accordingly, to be regarded in an illustrative rather than a restrictive sense, the invention being limited only by the provided claims.

What is claimed is:

1. A method for registering image fragments in a computer system, the computer system including a processor coupled to a user input device and display screen, the method comprising the following steps:

using the processor to display at least a portion of the first image fragment and at least a portion of the second image fragment simultaneously on the display screen;

accepting signals from the user input device to select the first image fragment displayed on the display screen;

dragging, in response to signals from the user input device, the first image fragment on the display screen to a new location;

dropping, in response to signals from the user input device, the first image fragment at the new location on the display screen so that a portion of the first image fragment is adjacent to and aligned with a portion of the second image fragment; and merging, by using the processor, the first and second image fragments into a combined image by using the adjacency and alignment from the "dragging" step.

2. The method of claim 1, wherein the computer system is coupled to a scanning device, the method further comprising the steps of:

using the scanning device to input two or more image fragments of an original image into the computer system, wherein the first and second image fragments are fragments from the original image; and wherein the step of merging includes the substep of registering the first and second image fragments into a combined image by using the adjacency and alignment from the "dragging" step so that the merged image closely approximates at least a portion of the original image.

3. The method of claim 1, wherein the user input device comprises a mouse having a button, the method further comprising the steps of:

wherein the step of "accepting signals from the user input device to select the first image" includes the substep of accepting signals from the mouse to select the first image; and wherein the step of "dragging the first image fragment" includes the substep of accepting signals from the mouse to indicate a new position for the first image fragment on the display screen.

4. The method of claim 1, wherein the user input device comprises a touch screen, the method further comprising the steps of:

wherein the step of "accepting signals from the user input device to select the first image" includes the substep of accepting signals from the touch screen to select the first image; and wherein the step of "dragging the first image fragment" includes the substep of accepting signals from the touch screen to indicate a new position for the first image fragment on the display screen.

5. The method of claim 2, wherein the computer system further comprises a printing device coupled to the processor for generating printed paper output, the method further comprising the steps of:

printing, by using the processor and merged image, a reproduction of at least a portion of the original image on one or more sheets of paper.

6. The method of claim 1, further comprising the step of:

making at least a portion of one or more of the image fragments transparent.

7. The method of claim 1, further comprising the step of:

enlarging the size of the image fragment on the display.

8. The method of claim 1, further comprising the step of:

using a polygonal outline to crop an image fragment.

9. The method of claim 1, further comprising the step of:

using an arbitrary outline to crop an image fragment.

10. A method for registering image fragments in a facsimile machine, wherein the machine includes a processor coupled to a user input device, memory and display screen, the method comprising the following steps:

storing two image fragments in the memory, wherein the image fragments are portions of a single original image;

using the processor to display at least a portion of the first image fragment and at least a portion of the second image fragment simultaneously on the display screen;

accepting signals from the user input device to select the first image fragment displayed on the display screen;

moving the first image fragment on the display screen according to the signals from the user obtained in the step of accepting signals so that a portion of the first image fragment is adjacent to, and aligned with, a portion of the second image fragment; and registering, by using the processor, the first and second image fragments into a combined image that approximates at least a portion of the single original image, wherein the registering step uses the adjacency and alignment from the previous step.

11. The method of claim 10, wherein the facsimile machine includes a printing device, wherein the processor is further coupled to a communication line, the method further comprising the steps of:

receiving data defining the two image fragments over the communication line;

wherein the step of storing two image fragments in the memory includes the substep of storing the received data in the memory; and using the printing device to output the combined image.

12. The method of claim 11, further comprising the steps of:

reducing the combined image so that the combined image, when printed, fits on a single sheet of paper.

13. The method of claim 10, wherein the processor is further coupled to a communication line, the method further comprising the step of:

transmitting the combined image over the communication line.

14. The method of claim 13, the method further comprising the step of:

reducing the combined image so that the image, when printed, fits on a single sheet of paper.

15. The method of claim 13, the method further comprising the step of:

transmitting information describing the relative positions of the first and second image fragments over the communication line.

16. A method for registering image fragments in a computer system, the computer system including a processor coupled to a memory, user input device, scanning device and display screen, the method comprising the following steps:

scanning an original document having an image shape to produce two or more image fragments, wherein the image fragments each include a part of the image shape;

inputing the two or more image fragments into the computer system;

using the processor to display the image fragments simultaneously on the display screen;

selecting an image fragment in response to signals from the user input device;

dragging the selected image fragment in response to signals from the user input device;

redisplaying the selected and moved image fragment at a new position on the display screen, wherein the new position shows the selected and moved image fragment adjacent to, and aligned with, one or more of the image fragments;

repeating the above selecting, dragging and redisplaying steps, to produce an orientation for the image fragments so that the image shape is displayed on the display screen; and registering the image fragments by defining an integrated image that includes portions of the image fragments and the relative orientations of the image fragments as displayed on the display screen at the time the registration is made.

17. An apparatus for registering image fragments in a computer system, the apparatus comprising:

a processor;

a memory coupled to the processor;

a user input device coupled to the processor;

a display screen coupled to the processor;

a data input device for storing representations of two or more image fragments of an original image into the memory;

display means for displaying at least a portion of the first image fragment and at least a portion of the second image fragment simultaneously on the display screen;

selection means for accepting signals from the user input device to select the first image fragment displayed on the display screen;

redisplay means for moving the first image fragment on the display screen in response to signals from the user input device;

position determining means for generating one or more parameters describing the locations of the moved first image fragment relative to the second image fragment when the moved first image fragment is adjacent to, and aligned with, a portion of the second image fragment; and registration means coupled to the redisplay means for receiving the parameters and for registering the first and second image fragments into a combined image based on the parameters.

* * * * *